(12) United States Patent
Tollefson et al.

(10) Patent No.: US 10,874,117 B2
(45) Date of Patent: Dec. 29, 2020

(54) FROZEN CONFECTION KIOSK AND LIQUID-DISPENSING ASSEMBLY FOR USE THEREWITH

(71) Applicant: TIKIZ FRANCHISING, LLC, Boca Raton, FL (US)

(72) Inventors: Brian J. Tollefson, Boca Raton, FL (US); David S. Tollefson, Boca Raton, FL (US)

(73) Assignee: TIKIZ FRANCHISING, LLC, Boca Raton, FL (US)

( * ) Notice: Subject to any disclaimer, the term of this patent is extended or adjusted under 35 U.S.C. 154(b) by 0 days.

(21) Appl. No.: 16/536,995

(22) Filed: Aug. 9, 2019

(65) Prior Publication Data

US 2020/0029588 A1     Jan. 30, 2020

Related U.S. Application Data

(63) Continuation-in-part of application No. 15/982,708, filed on May 17, 2018, which is a continuation of application No. 14/922,853, filed on Oct. 26, 2015, now Pat. No. 10,231,471, which is a continuation-in-part of application No. 13/559,664, filed on Jul. 27, 2012, now Pat. No. 9,352,679.

(51) Int. Cl.
  *A23G 9/28* (2006.01)
  *B60P 3/025* (2006.01)

(52) U.S. Cl.
  CPC .............. *A23G 9/28* (2013.01); *B60P 3/0257* (2013.01)

(58) Field of Classification Search
  CPC .................................. A23G 9/28; B60P 3/0257

USPC ........................................... 222/135; 312/245
See application file for complete search history.

(56) References Cited

U.S. PATENT DOCUMENTS

| | | | | |
|---|---|---|---|---|
| 2,733,094 | A * | 1/1956 | Carlton | A47F 1/04 296/22 |
| 2,982,578 | A * | 5/1961 | Lowe | B60P 3/0257 296/22 |
| 2,990,227 | A * | 6/1961 | McCaleb | G07F 9/10 312/35 |
| 3,191,400 | A * | 6/1965 | Swenson | B60P 3/0257 62/239 |
| 3,476,295 | A * | 11/1969 | Telfer | F25D 23/126 222/183 |
| 4,076,349 | A * | 2/1978 | Gettleman | A47B 31/02 312/236 |
| 4,720,622 | A * | 1/1988 | Iwata | A47B 77/08 219/391 |
| 4,854,655 | A * | 8/1989 | Saunders | B67D 1/0021 312/257.1 |
| 5,870,902 | A * | 2/1999 | Garrett, Jr. | F24F 1/22 49/484.1 |
| 6,012,790 | A * | 1/2000 | Thomas | E04H 1/1222 312/257.1 |

(Continued)

*Primary Examiner* — Michael J. Melaragno
(74) *Attorney, Agent, or Firm* — Millen, White, Zelano & Branigan, P.C.; William Nixon (57) ABSTRACT

An apparatus has a kiosk for selling frozen confections such as shaved ice or ice cream. The apparatus includes a liquid topping dispenser assembly having liquid dispensing faucets that are operable by a customer outside the kiosk to dispense liquid toppings onto the frozen confection. The liquid topping dispenser assembly is mounted onto a sidewall of the kiosk such that an open space is formed. A gasket assembly is positioned within the open space.

17 Claims, 7 Drawing Sheets

(56) References Cited

U.S. PATENT DOCUMENTS

| | | | | |
|---|---|---|---|---|
| 6,189,944 B1* | 2/2001 | Piche | | B60P 3/0257 |
| | | | | 296/22 |
| 6,852,924 B2* | 2/2005 | Lessard | | H05K 9/0073 |
| | | | | 174/377 |
| 7,044,335 B2* | 5/2006 | Aguirre | | B67D 1/0406 |
| | | | | 222/129.1 |
| 7,364,050 B2* | 4/2008 | Guard | | B60P 3/0257 |
| | | | | 221/131 |
| 7,669,740 B2* | 3/2010 | Saunders | | G07F 9/10 |
| | | | | 141/231 |
| D633,007 S * | 2/2011 | Evans | | D12/83 |
| 8,157,136 B2* | 4/2012 | Lamb | | B60P 3/0257 |
| | | | | 222/108 |
| 8,622,453 B1* | 1/2014 | Karapetian, Jr. | | B60P 3/0257 |
| | | | | 296/22 |
| D704,493 S * | 5/2014 | Tollefson | | D7/307 |
| 8,763,834 B2* | 7/2014 | Skovira | | B65D 21/083 |
| | | | | 220/23.4 |
| 8,915,407 B2* | 12/2014 | Lamb | | B60P 3/0257 |
| | | | | 141/231 |
| 9,170,040 B2* | 10/2015 | An | | F25D 23/126 |
| 9,321,387 B2* | 4/2016 | Lamb | | B67D 1/0889 |
| 9,352,679 B2* | 5/2016 | Tollefson | | B60P 3/0257 |
| 9,643,828 B2* | 5/2017 | Brown | | B67D 1/06 |
| 9,751,447 B2* | 9/2017 | Lamb | | B67D 1/0889 |
| 10,112,522 B2* | 10/2018 | Tollefson | | A23G 9/288 |
| 10,231,471 B2* | 3/2019 | Tollefson | | B60P 3/0257 |
| D879,665 S * | 3/2020 | Tollefson | | D12/102 |
| 10,604,055 B2* | 3/2020 | Eismann | | B60N 3/16 |
| 10,617,132 B2* | 4/2020 | Tollefson | | B60P 3/0257 |
| 2001/0015600 A1* | 8/2001 | Duong | | H02B 1/303 |
| | | | | 312/351.1 |
| 2004/0256872 A1* | 12/2004 | Piper | | B60P 3/0257 |
| | | | | 296/24.36 |
| 2006/0119239 A1* | 6/2006 | Werwick | | A47B 47/0008 |
| | | | | 312/334.29 |
| 2008/0253872 A1* | 10/2008 | Tollefson | | B60P 1/025 |
| | | | | 414/458 |
| 2009/0078724 A1* | 3/2009 | Lamb | | B60P 3/0257 |
| | | | | 222/608 |
| 2012/0199616 A1* | 8/2012 | Lamb | | B60P 3/0257 |
| | | | | 222/608 |
| 2014/0027471 A1* | 1/2014 | Tollefson | | B60P 3/0257 |
| | | | | 222/108 |
| 2014/0239020 A1* | 8/2014 | Lamb | | B60P 3/0257 |
| | | | | 222/610 |
| 2014/0299630 A1* | 10/2014 | Brown | | B67D 3/0054 |
| | | | | 222/129.1 |
| 2015/0069087 A1* | 3/2015 | Brown | | A47J 31/41 |
| | | | | 222/129.1 |
| 2016/0044936 A1* | 2/2016 | Tollefson | | A23G 9/28 |
| | | | | 222/144.5 |
| 2016/0121778 A1* | 5/2016 | Lamb | | B67D 1/0889 |
| | | | | 222/608 |
| 2016/0264033 A1* | 9/2016 | Tollefson | | B60P 3/0257 |
| 2018/0263257 A1* | 9/2018 | Tollefson | | A23G 9/28 |
| 2019/0039498 A1* | 2/2019 | Tollefson | | B60P 3/0257 |
| 2019/0166874 A1* | 6/2019 | Douer | | A23G 9/28 |
| 2019/0281860 A1* | 9/2019 | Tollefson | | A23G 9/22 |

* cited by examiner

FROZEN CONFECTION KIOSK AND LIQUID-DISPENSING ASSEMBLY FOR USE THEREWITH

FIELD OF THE INVENTION

The present invention relates to a kiosk for dispensing food and drink items, especially frozen confections such as ice cream, snow cones, shaved ice, and the like. More particularly, the present invention relates to a kiosk and a liquid topping dispenser assembly that may be accessed by customers outside the kiosk.

DESCRIPTION OF THE RELATED ART

Stationary and mobile kiosks sell various frozen confections, such as ice cream, shaved ice, snow cones, beverages, and so forth. If the kiosk is situated for selling ice cream, then containers of ice cream that can be scooped into a cone or dish are provided. The kiosk also may include soft ice cream makers within the kiosk whereby a person within the kiosk may prepare the ice cream confection for dispensing through a service window upon payment for the item.

A kiosk also may be situated to sell snow cones, or shaved ice, also known as Italian ice. A liquid toppings dispenser may be inside the kiosk for dispensing a sweet liquid topping onto the crushed, or shaved, ice in order to produce the confection that is dispensed through the service window. It is also known to provide a liquid topping dispenser assembly that is accessible from outside the kiosk so that the customer can apply the liquid topping to the ice cream, crushed ice, shaved ice, and the like. These dispensers, however, may be exposed to elements, debris, and other items that reduce usability of the dispensers.

SUMMARY OF THE INVENTION

An apparatus is disclosed. The apparatus includes a kiosk including a first sidewall, a second sidewall, and a back wall defining an interior chamber. The apparatus also includes an axial axis of the kiosk defined as horizontally extending from the back wall between the first sidewall and the second sidewall. The apparatus includes a mounting bracket extending external to the first sidewall or second sidewall. The apparatus also includes a liquid topping dispenser assembly including a support and a plurality of liquid dispensing faucets carried by the support. The dispenser assembly is seated on the mounting bracket. The dispenser assembly is secured to the mounting bracket so that the dispenser assembly is fixed with respect to the first sidewall or the second sidewall to form an open space between the dispenser assembly and the first or second sidewall. The apparatus also includes a gasket assembly positioned within the open space between the dispenser assembly and the first or second sidewall. The apparatus also includes a plurality of fasteners to further mount the dispenser assembly to the first or second sidewall.

An apparatus is disclosed. The apparatus includes a kiosk having at least one sidewall to define an interior chamber. The apparatus also includes a frozen confection forming device positioned within the interior chamber and a serving window formed through the sidewall and configured to allow a frozen confection to pass through the serving window from the interior chamber to outside the kiosk. The apparatus also includes a liquid topping dispenser assembly having a support and a plurality of liquid dispensing faucets carried by the support. The dispenser assembly is secured to the sidewall using a mounting bracket so that the dispenser assembly is fixed with respect to the sidewall to form an open space between the dispenser assembly and the sidewall. The apparatus also includes a plurality of hoses connected to the plurality of dispensing faucets and to a plurality of containers of liquid toppings in the interior chamber. The apparatus also includes a gasket assembly having a plurality of seal strips positioned in the open space between the dispenser assembly and the sidewall. The plurality of seal strips has an upper seal strip in contact with a top of the dispenser assembly and the sidewall and a lower seal strip positioned above the mounting bracket. The apparatus also includes a plurality of fasteners to secure the dispenser assembly to the sidewall using at least one mounting piece.

BRIEF DESCRIPTION OF THE DRAWINGS

Various other features and attendant advantages of the present invention will be more fully appreciated as the same becomes better understood when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

Figure 1:
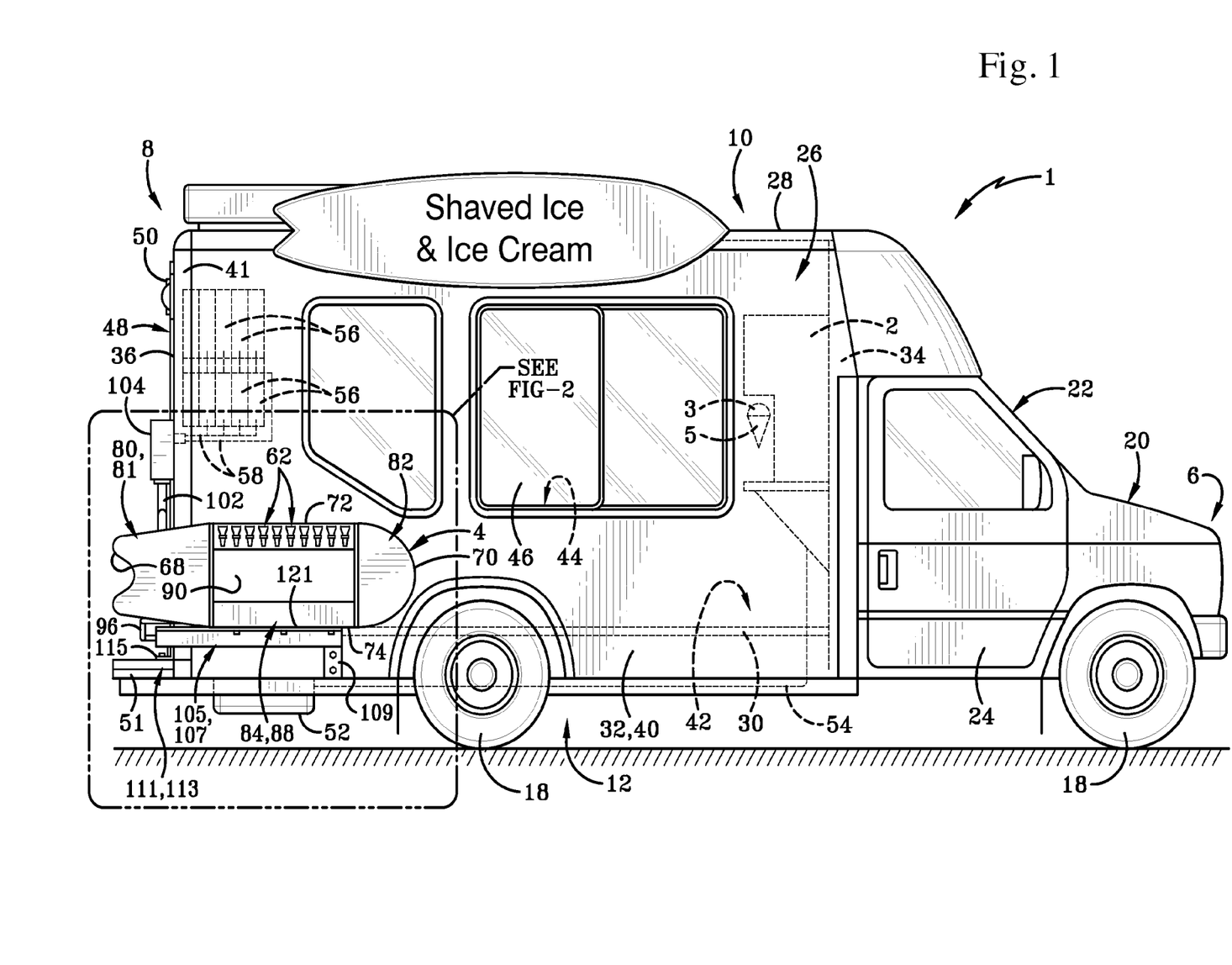
FIG. 1 illustrates a right side elevational view of kiosk shown as a mobile vehicle with a liquid topping dispenser assembly mounted adjacent the rear of the vehicle according to the disclosed embodiments.

FIG. 1 depicts a kiosk 1 according to the disclosed embodiments. Although kiosk 1 is disclosed in the figures as a motorized mobile vehicle, kiosk 1 also may represent a non-motorized wheeled vehicle, such as a trailer, or a non-wheeled kiosk. A non-wheeled kiosk may be seated directly on the ground and either be a permanent structure or one that is portable by, for instance, being mounted or connected to a separate mobile vehicle. Kiosk, or vehicle, 1 may be configured to produce frozen confections 3 to be contained in container 5, which may be a cup, cone, dish, or the like. Kiosk 1 may be configured with a frozen confection forming device 2 inside the kiosk and a liquid topping dispenser assembly 4 that is configured to be operated by people/customers outside the kiosk. Thus, kiosk, or vehicle, 1 may be configured for an operator or other person within the kiosk to produce a frozen confection such as ice cream, snow cone, shaved ice, and the like to dispense it to a customer outside the vehicle so that the customer may dispense the liquid topping with dispenser 4 onto the crushed ice, shaved ice, or frozen confection of any sort. The customer does not need to wait for the operator to apply the liquid toppings.

Figure 5:
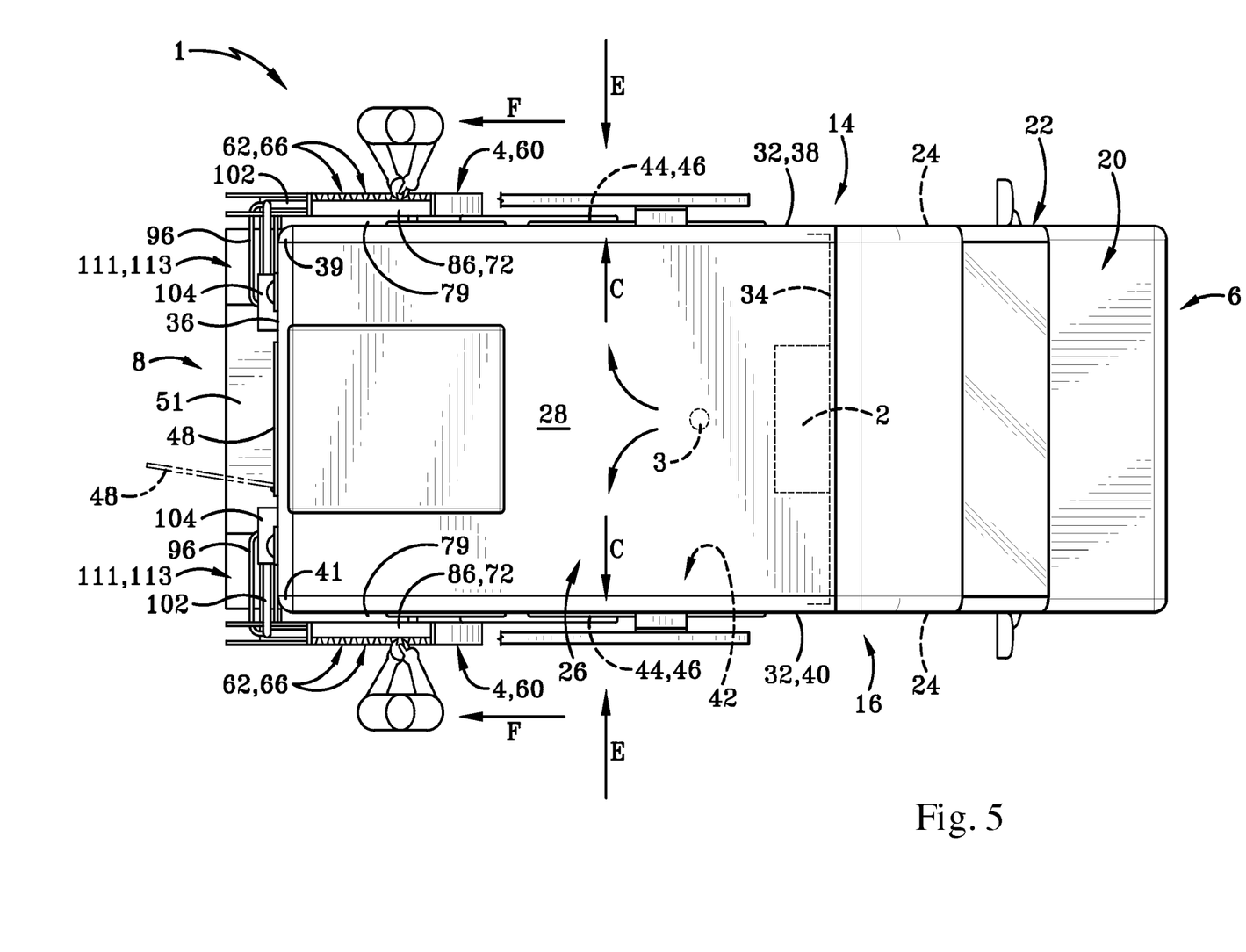
FIG. 5 illustrates a top plan view showing the vehicle with two liquid topping dispenser assemblies mounted respectively near the rear left and right corners of the vehicle according to the disclosed embodiments.

Vehicle 1 has a front 6 and a back 8 defining a longitudinal direction of the vehicle or kiosk, a top 10, a bottom 12, and left and right sides 14 and 16, as shown in FIG. 5, defining therebetween an axial direction of the vehicle or kiosk. If kiosk 1 is a vehicle, then the longitudinal direction may represent the travel direction of the vehicle. Vehicle 1 includes ground engaging wheels 18 that are rotatably mounted on the frame of the vehicle. A front set of wheels 18 is adjacent front 6 and a rear set of wheels 18 are generally adjacent back 8 of vehicle 1. Vehicle 1 also includes an engine compartment 20 that may house an engine that drives rotation of at least some of the wheels in order to cause the vehicle to move.

Vehicle 1 also includes a cab 22 with doors 24 on the driver side and passenger side, shown as the left and right sides of vehicle 1 or cab 22. Vehicle 1 also includes a cargo body or box 26 extending from adjacent the back of cab 22 to adjacent back 8 of the vehicle. Body 26 may include essentially horizontal and rectangular top and bottom walls 28 and 30 and a sidewall 32 secured to and extending between the top and bottom walls 28 and 30. Body 26 or walls 28, 30, and 32 may be rigid. Sidewall 32 is an upwardly extending wall that may be an essentially vertical wall and that may include essentially vertical front and back walls 34 and 36 that may be essentially parallel to one another, which are rectangular or square as viewed from the back or front, and which extend axially along respective vertical axial planes.

Sidewall 32 may further include essentially vertical left and right walls 38 and 40 that may be essentially parallel to one another and perpendicular to front and back walls 34 and 36. Left and right walls 38 and 40 extend longitudinally and may lie along respective longitudinal vertical planes. Walls 34, 36, 38, and 40 may be rigid and fixed with respect to one another and may be joined to form respective essentially vertical corners. More particularly, the rear end of left wall 38 and a left side of back wall 36 may intersect at an essentially vertical left rear corner 39. Similarly, the rear end of right wall 40 and the right side of back wall 36 may intersect at an essentially vertical right rear corner 41. Each of corners 39 and 41 may extend from adjacent top wall 28 to adjacent and lower than bottom wall 30. Top wall 28, bottom wall 30, and sidewall 32 may define an interior chamber 42.

Cargo body 26 may have a generally box shape or parallelepiped configuration. Bottom wall 30 may be spaced upwardly of the bottom of sidewall 32 including upward of the bottom of walls 34, 36, 38, and 40 so that lower portions of walls 32, 34, 36, 38, and 40 may extend downward lower than bottom wall 30. Bottom wall 30 may, for example, be at about the same height as the bottom of back door 48 and the bottom of the doorway that door 48 covers when closed.

An opening or service window 44 may be formed through right wall 40 with a panel, door, or window pane 46 mounted to move between an opened and closed position for opening and closing serving window 44. An additional service window 44 and corresponding panel, door, or window pane may be positioned along the left side of the vehicle alternatively or in addition to the one along the right side, as illustrated in FIG. 5. Vehicle 1 may have a back door 48 that is movable between a closed position and an open position, shown with dashed line in FIG. 5. Back door 48 may be mounted on hinges 50 in order to pivot about a vertical axis between the open and closed positions, whereby a person may enter and exit interior chamber 42 when back door 48 is open.

Vehicle 1 may include a rigid back bumper or step 51 that may be an essentially horizontal axially elongated member that may extend rearward of or be entirely rearward of back wall 36. Bumper 51 may extend from adjacent the bottom of left rear corner 39 to adjacent the bottom of back wall 36. Step 51, which may be rigidly secured to the vehicle frame, may be configured for a person to step up onto when entering the inside of the kiosk through back door 48.

A waste liquid reservoir or container 52 may be mounted on vehicle 1 adjacent the back end along the bottom of the frame, although the specific position may vary. Container 52 may be within or separate from the vehicle, for instance, sitting on the ground. A drain line 54 may be connected to one end to forming device 2 with another end connected to container 52 or a separate waste liquid container. A plurality of liquid topping containers 56 may be disposed within interior chamber 42 and contain various types of potable liquid toppings, preferably having different flavors or colors, that may be dispensed through dispenser assembly 4. Ten of containers 56 are shown in FIG. 1, although this number may vary. Feed lines 58 may be provided that may be in the form of flexible hoses or tubes for providing fluid communication between the respective containers 56 and dispenser assembly 4. Thus, one end of each feed line 58 is connected to an outlet of container 56.

Figure 2:
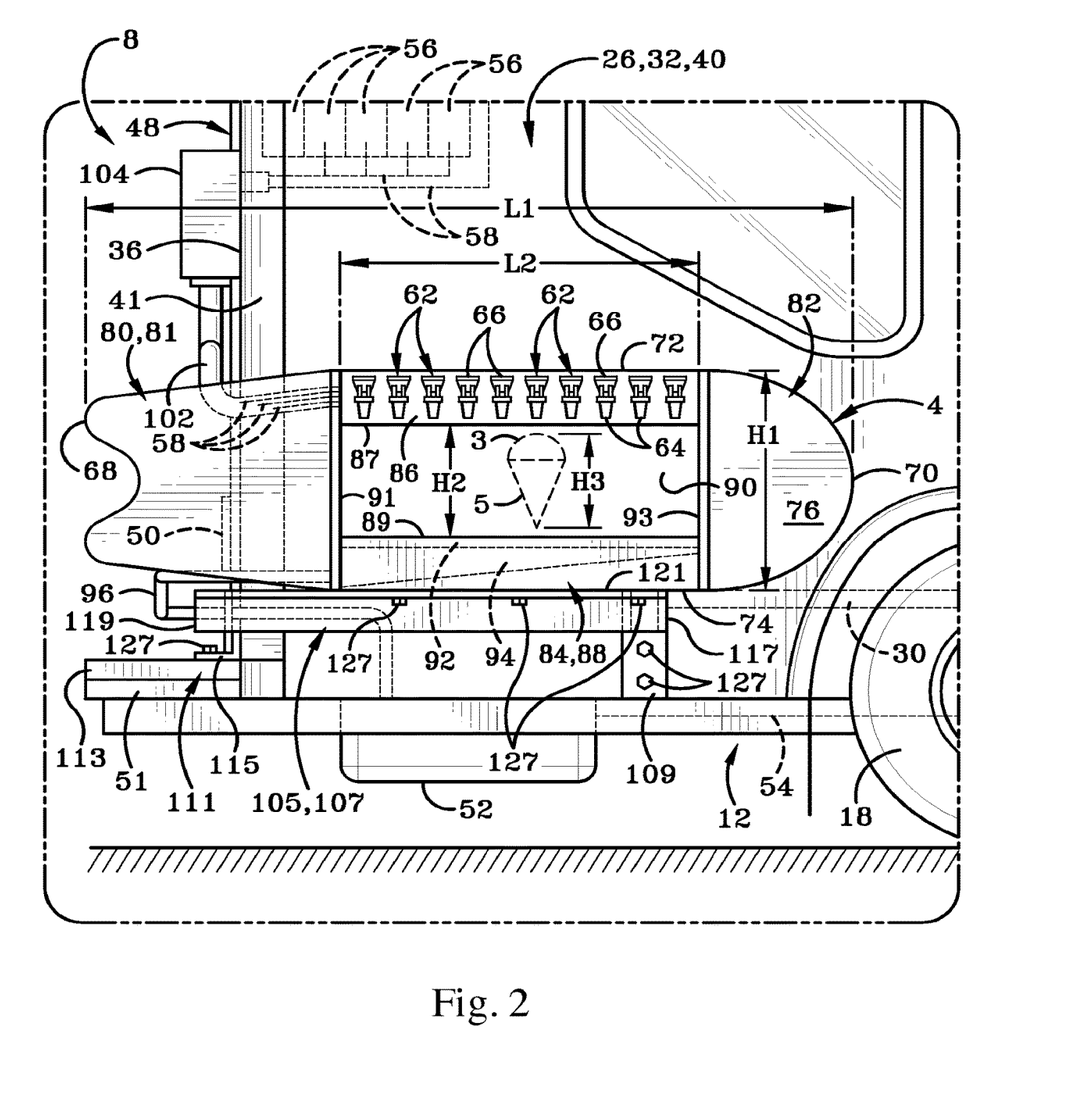
FIG. 2 illustrates an enlarged right side elevational view of a right rear portion of the kiosk/vehicle and the liquid topping dispenser assembly according to the disclosed embodiments.

FIG. 2 depicts a right dispenser assembly 4 mounted on vehicle 1, while FIG. 5 depicts a left dispenser assembly 4 mounted on vehicle 1. Right dispenser assembly 4 may be mounted adjacent the right rear corner 41 of vehicle 1 while left dispenser assembly 4 may be mounted adjacent the left rear corner 39. Left dispenser assembly 4 may be mounted in the same manner as right dispenser assembly 4 except in a mirror image fashion such that the left dispenser assembly is generally to the left of left wall 38.

Referring to FIG. 2, right dispenser assembly 4 will be disclosed. Much of the description of right dispenser assembly 4 also applies to left dispenser assembly although the two dispenser assemblies may be mirror images. The left and right assemblies 4 may be mounted in different locations such that components that extend to the right and left with respect to right dispenser assembly 4 may extend respectively to the left and right with respect to left dispenser assembly 4, or surfaces that may be leftward facing and rightward facing with respect to right dispenser assembly 4 may respectively be rightward facing and leftward facing with respect to left dispenser assembly 4.

Right dispenser assembly 4 includes a rigid dispenser support 60 and a plurality of faucets 62, wherein each faucet 62 includes a spout 64 and a control 66 that is manually operable and may be in the form of a button or handle that is movable from a closed position to an open position by engagement of a person having container 5 of frozen confection 3. Dispenser assembly 4 may be mounted adjacent and entirely external to box 26 and kiosk 1. Dispenser assembly 4 may be fixedly attached to kiosk, or vehicle, 1 so that the assembly is fixed with respect to sidewall 32 and its various walls 34, 36, 38, and 40. Assembly 4 may be spaced outwardly from body 26 or sidewall 32 so that dispenser assembly 4 is out of contact with sidewall 32.

Support 60 has a first or rear end 68 and a distal second or front end 70 such that support 60 and dispenser assembly 4 may be longitudinally elongated from rear end 68 to front end 70. Ends 68 and 70 define a horizontal longitudinal length L1 that may be in a range of about 3 to 4 feet to about 6 feet. Given that dispenser assembly 4 may have a substantial length and that it is spaced outwardly of body 26 of vehicle 1, the dispenser assembly may provide a visual display having a customer attracting feature, especially given a specific shape that customers may come to recognize as indicative of the given vendor. Rear end 68 may be adjacent, and rearward or forward of, corner 41 and the lower end thereof, the right side of back wall 36 and the bottom thereof, and the back end of right wall 40 and the bottom thereof. Front end 70 may be adjacent and rearward of rear wheels 18.

Figure 3:
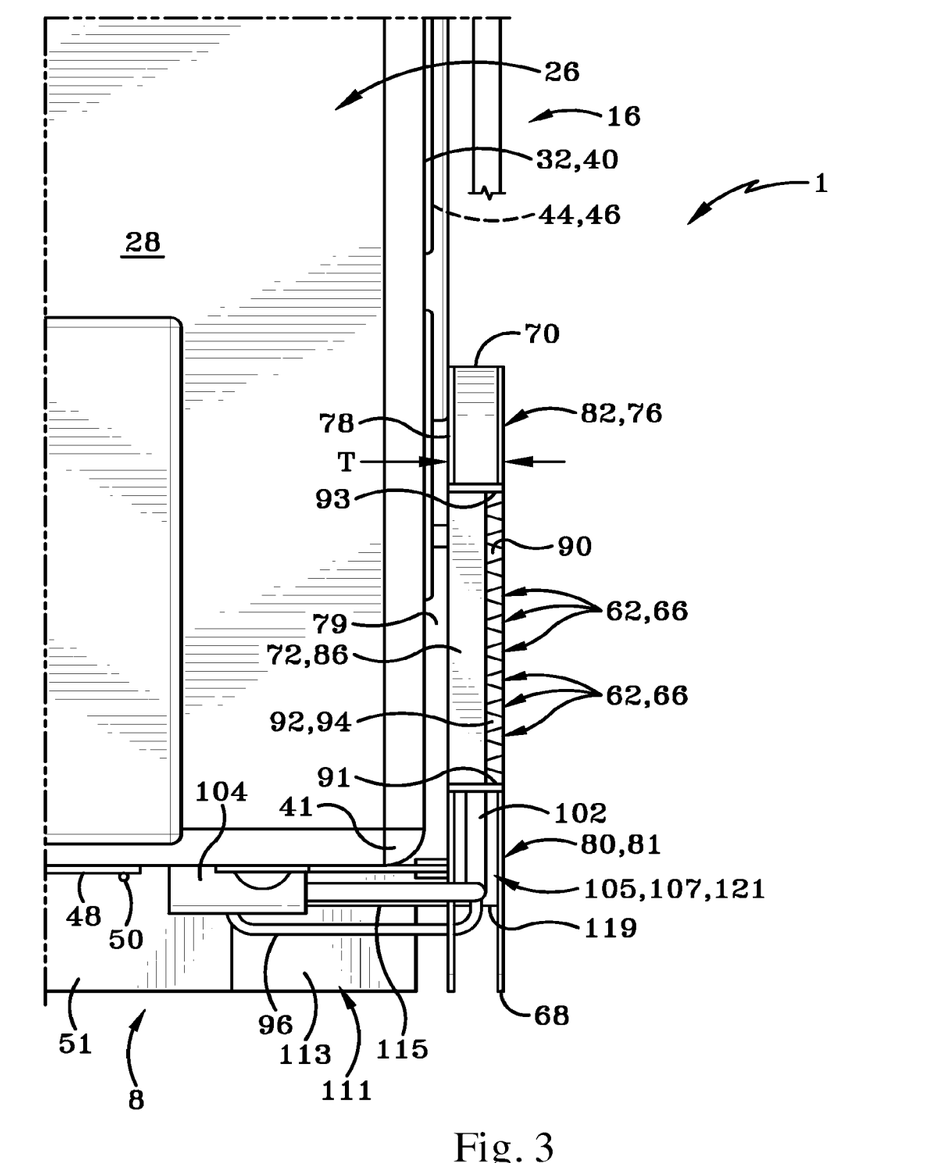
FIG. 3 illustrates an enlarged top plan view of a right rear portion of the kiosk/vehicle and the dispenser assembly according to the disclosed embodiments.

Support 60 has a top 72 and a bottom 74 defining a vertical distance or height H1, as shown in FIG. 2, that may be a value of no more than ½ length L1 or ⅓ length L1. Height H1 may be a value of approximately ⅓ of length L1 or slightly less. Support 60 has first and second surfaces or sides 76 and 78 defining a horizontal thickness T, as shown in FIG. 3. Horizontal thickness T may be a value of no more than ½ of height H1 or ⅓ of height H1. Thickness T may be a value of about ¼ of height H1. Each of sides 76 and 78 may be an essentially flat vertical surface extending from adjacent rear end 68 to adjacent front end 70 and from adjacent top 72 to adjacent bottom 74. Side or surface 76 may be a rightward facing right side or surface, and side or surface 78 may be a leftward facing left side or surface such that thickness T is an axial thickness.

Support 60 may include a rear segment 80, a front segment 82, and a central or intermediate segment 84 connected to and extending between rear and front segments 80 and 82. Rear segment 80 may include first and second walls 81 and 83, which may be flat, vertical, parallel, and spaced from one another to define an essentially vertical open space 85. Intermediate segment 84 may include an essentially horizontal upper arm 86 and an essentially horizontal lower arm 88, each of which extends between and is secured to rear and front segments 80 and 82.

Left surface 78 of support 60 may face and be parallel to and spaced from right wall 40 and the rightward facing surface thereof. Left surface 78 and the rightward facing surface of right wall 40 may define an open space 79 that may extend from adjacent rear end 69 to adjacent front end 70 and from adjacent top 72 to adjacent bottom 74. Right surface 76 of support 60 may face away from and be parallel to, and spaced from right wall 40 and the rightward facing surface thereof.

A set of faucets 62 may be mounted on upper arm 86 and extend outwardly in a first direction within a recess generally along side 76. It may be that no portion of any of faucets 62 extends outwardly beyond side 76 or outwardly to the right beyond right side/surface 76. The various faucets 62 may be longitudinally spaced from each other along the length of assembly 4 or support 60 at regular intervals so that one of the faucets 62 is a rearmost faucet and the remaining faucets 62 are sequentially forward of and further away therefrom. Faucets 62 may be equally spaced along the length of support 60. Each of the faucets may be the same horizontal axial or normal distance from the right side or surface of right wall 40.

Support 60 may define a rectangular opening 90 extending from first side 76 to second side 78. More particularly, opening 90 may be defined by an essentially horizontal downwardly facing bottom surface 87 of upper arm 86, an essentially horizontal upwardly facing top surface 89 of lower arm 88, an essentially vertical forward facing surface 91 of rear segment 80, and an essentially vertical rearward facing surface 93 of front segment 82. Surfaces 91 and 93 may be essentially parallel and face one another and define therebetween a horizontal length L2, which may be a value of at least ¼ of length L1 or at least ⅓ of length L1. Length L2 may be a value of about and slightly less than ½ of length L1. The respective rear and front ends of upper and lower arms 86 and 88 may be secured respectively to surfaces 91 and 93, whereby the rear and front ends of each arm may define therebetween length L2 of each arm 86 and 88, wherein the length may be the same as the length of opening 90.

Bottom and top surfaces 87 and 89 may define therebetween a vertical distance or height H2, which may be about 12 inches although this value may vary somewhat and may more particularly be configured to allow the frozen confection and its container to pass through opening 90 from one side to the other side of support 60. Confection 3 and its cone, cup, or dish 5 together may have as measured from top to bottom a height H3 which is less than height H2. Space 79 may be in communication with through opening 90 with the opening directly to the right of the space. Opening 90 also may be directly to the right of right wall 40.

A flow through structure, such as a grate 92 or a plate with multiple apertures extending from the top to the bottom may be disposed within a cavity defined by lower arm 88 along the top of arm 88. An angled or inclined drip pan or flow pan 94 may be disposed within this cavity of arm 88. Pan 94 may angle downward and rearward toward rear end 68 or downward and forward toward front end 70. Thus, any drips or overflow liquid coming from faucets 62 that is not dispensed onto the confection or container may be caught and flowed through structure 92 and onto drip pan 94, along which the liquid may flow, for instance, downwardly toward rear end 68 or front end 70 and into a drain hose 96 having one end connected to the drip pan adjacent its lower end and another end in fluid communication with container 52 for emptying the waste liquid into container 52.

Dispenser assembly 4 may be entirely to the right of right wall 40 so that no portion of the dispenser assembly is directly behind back wall 36. Over ½ or ¾ of length L1 of dispenser assembly 4 or all of assembly 4 may be directly to the right of right wall 40 and forward of back wall 36 and the front of bumper 51. Front end 70, front segment 82, intermediate segment 84 including upper and lower arms 86 and 88, faucets 62, opening 90, surfaces 91 and 93, grate 92, pan 94, and a portion of rear segment 80 may be directly to the right of right wall 40 and forward of back wall 36. Faucets 62 may be longitudinally spaced from each other.

A hose bundle 102 including hoses 58 may extend within space 85 and also external to space 85 from adjacent rear end 68 to a hose cover or hose junction box 104 that may be secured to back wall 36. One end of each hose 58 may be connected to a corresponding faucet 62 whereby hoses 58 may provide respective fluid communication between the respective containers 56 and faucets 62. For example, if dispenser assembly 4 includes 10 faucets, then it may use 10 hoses to deliver the liquid toppings. Hose cover 104 may have a removable panel or openable door that allows access to hoses 58 within the interior chamber defined by the cover. Each hose 58 may include two segments that are connected to one another by a quick disconnect connection that may be disposed within box 104. Hoses 58 extend through a hole, preferably covered by box 104, which may be formed in back wall 36 or one of the left and right walls of body 26 such that the hole extends from outside vehicle 1 or body 26 to interior chamber 42.

A mounting bracket 105 may be provided to mount each of the left and right dispenser assemblies 4 outside body/box 26. There may be left and right brackets 105 for respectively mounting the left and right assemblies 4. The right mounting bracket 105 will be disclosed, and it will be understood that the left mounting bracket 105 may be correspond to this disclosure. Left mounting bracket 105 may have components that extend in directions opposite that of the right mounting bracket or have surfaces that face in the direction opposite that of the right mounting bracket.

Right mounting bracket 105 may be in its entirety adjacent rear corner 41, the right side of back wall 36, and the rear section of right wall 40 rearward of rear wheels 18. Mounting bracket 105 may be in its entirety adjacent the bottom of sidewall 32. A portion of bracket 105 may be directly behind back wall 36 and a portion of bracket 105 may be directly to the right of right wall 40. Dispenser assembly 4 or support 60 may be rigidly or fixedly secured to bracket 105. Bracket 105 may be rigidly or fixedly secured to bumper 51, body 26, or the frame or chassis of vehicle 1. Bracket 105 may be a rigid structure, which may be formed as one unitary piece or a plurality of rigid pieces that may be rigidly secured to each other by one or more welds or one or more other fasteners such as threaded fasteners, for instance, screws or externally threaded bolts that may be threadedly engaged with internally threaded holes or nuts.

Bracket 105 may include a support bar 107 that may be a longitudinally elongated longitudinal bar, support, or shelf. Bracket 105 may include a front spacer or mounting member 109 and a rear spacer or mounting member 111. Bar 107 and front spacer 109 may be entirely to the right of right wall 40. Rear spacer 111 may include a plate 113 and an axial bar 115. Spacer 111 including plate 113 and bar 115 may extend directly behind back wall 36. Bar 107 may have front and rear ends 117 and 119. Front spacer 109 may be adjacent front end 117 and extend inwardly from bar 107 to right wall 40/sidewall 32. Support bar 107 may be in the form of an angle iron although other configurations may be used. Bar 107 may have an upwardly facing top surface 121 that may be horizontal and longitudinally elongated from adjacent front end 117 to adjacent read end 119.

Bottom 74 of dispenser assembly 4 or support 60 may be seated on and in contact with upwardly facing top surface 121 of bracket 105 or bar 107 so that the dispenser assembly or the support extend upwardly therefrom. Dispenser assembly 4, support 60, or faucets 62 may be entirely higher than surface 121. Rear spacer 111 or axial bar 115 may have an inner or left end 123 and an outer or right end 125. Inner end 123 may be directly above bumper 51 and plate 113, and outer end 125 spaced outwardly to the right of bumper 51 and plate 113 so that outer end 125 is not directly above bumper 51 and plate 113. Inner end 123 may be to the left of right wall 40 and outer end 125 may be to the right of right wall 40. Bar 107 adjacent rear end 119 may be rigidly or fixedly secured to rear spacer 111 or bar 115 adjacent right end 125 and extend forward therefrom. Spacer 111 or plate 113 may be in contact with bumper 51. Spacer 109 may be in contact with right wall 40 or sidewall 32.

Figure 4:
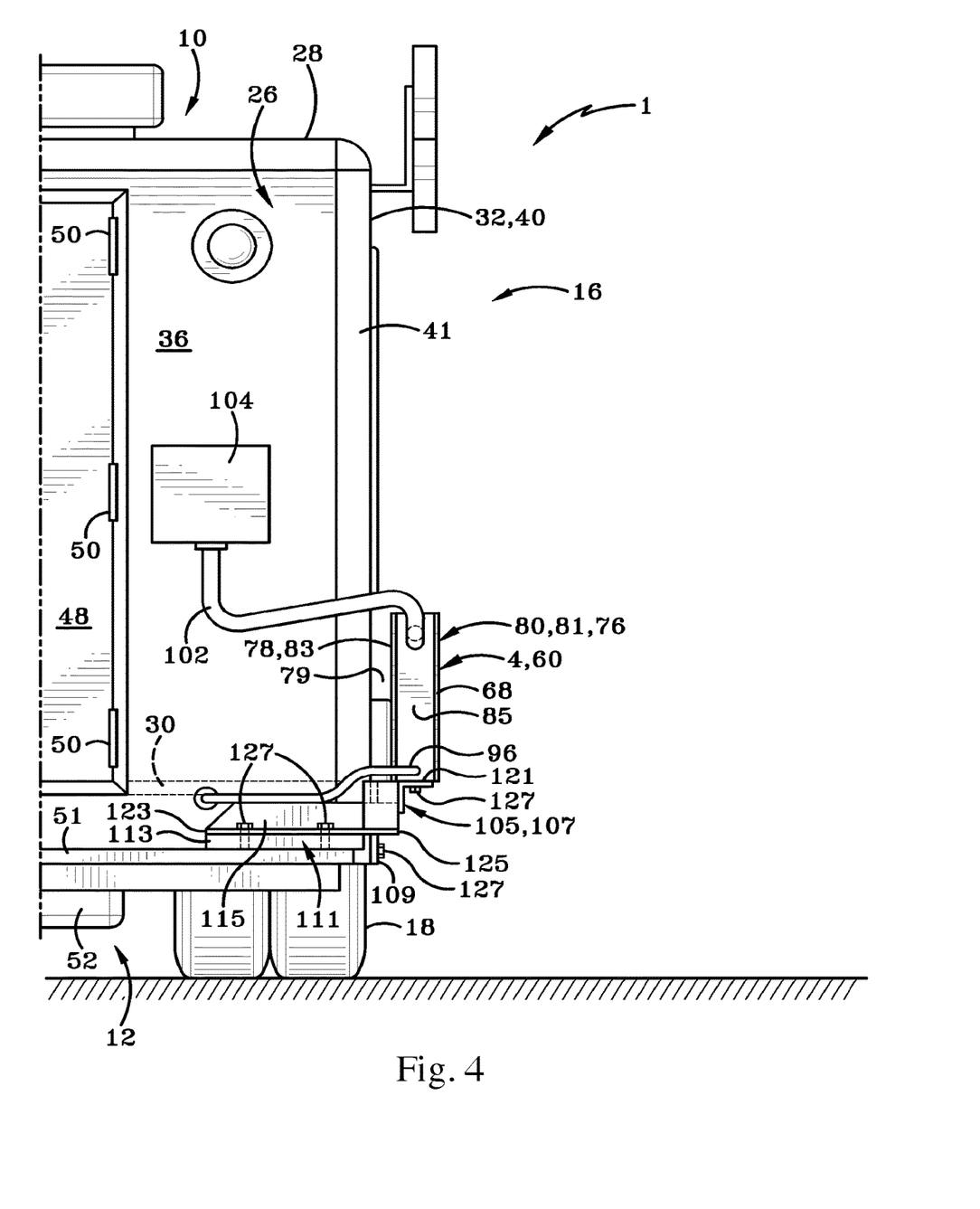
FIG. 4 illustrates an enlarged rear elevation view of a right rear portion of the kiosk/vehicle and the dispenser assembly according to the disclosed embodiments.

The various components that comprise bracket 105, such as bar 107, spacers 109 and 111 including plate 113 and bar 115, and which are in contact with or closely adjacent one another may be secured to each other by welds or other fasteners such as fasteners 127. Fasteners 127 may be threaded fasteners such as screws or threaded bolts that threadedly engage an internally threaded hole or nut. Fasteners 127 are particularly shown in FIG. 4 extending downward from bar 115 to plate 113 and bumper 51 to thereby also rigidly or fixedly secure bar 115 to plate 113 and bumper 51, thereby also rigidly or fixedly securing bracket 105 to bumper 51. Fasteners 127 also are shown in FIG. 2 extending axially from front spacer 109 to right wall 40 to rigidly or fixedly secure spacer 109 to right wall 40 or sidewall 32, thereby also rigidly or fixedly securing bracket 105 to right wall 40 or sidewall 32. The fasteners extending from spacer 109 to right wall 40 may be lower than bottom wall 30 and, therefore, pass through or engage the portion of right wall 40 that extends lower than bottom wall 30. FIG. 2 also shows fasteners 127 extending upward from bar 107 or surface 121 to support 60 or assembly 4 along bottom 74 thereof to rigidly or fixedly secure support 60 or assembly 4 to bar 107 or bracket 105.

The right dispenser assembly 4 and the right bracket 105 are disclosed above. Some aspects of left dispenser assembly 4 and left mounting bracket 105 are noted below, that is, the primary distinctions that relate to the position of the left assembly and the left bracket relative to sidewall 32 and other components, as well as left assembly 4 and left bracket 105 being essentially mirror images of the right assembly 4 and the right bracket 105. Left assembly 4 and left bracket 105 may extend outwardly to the left beyond left wall 38 and the various other components of vehicle 1. The various components of right assembly 4 and right bracket 105 that may be to the right of or extend to the right of other components may in the case of left assembly 4 and left bracket 105 be to the left of or extend to the left of analogous components. Similarly, the various components of right assembly 4 and right bracket 105 that may be to the left of or extend to the left of other components may, in the case of the left assembly 4 and left bracket 105, be to the right of or extend to the right of analogous components.

Right surface 78 of left support 60 may face and be parallel to and spaced from left wall 38 and the leftward facing surface thereof. Right surface 78 of left support 60 and the leftward facing surface of right wall 40 may define a left open space 79 as noted above with respect to right support 60. Left surface 76 of left support 60 may face away from and be parallel to and spaced from left wall 38 and the leftward facing surface thereof.

A set of left faucets 62 may be mounted on upper arm 86 of left support 60 and extend outwardly therefrom to the left within a recess generally along left side 76. It may be that no portion of any of faucets 62 extends outwardly to the left beyond side/surface 76. Each of the left faucets may be the same horizontal axial or normal distance from the left side or surface of left wall 38. Left space 79 may be in communication with left through opening 90 of left support 60 with opening 90 directly to the left of left space 79 and directly to the left of left wall 38.

Left dispenser assembly 4 may be entirely to the left of left wall 40 such that no portion of left assembly 4 is directly behind back wall 36. Over ½ or ¼ of length L1 of left dispenser assembly 4 or all of assembly 4 may be directly to the left of left wall 40 and forward of back wall 36 and the front of bumper 51. Front end 70, front segment 82, intermediate segment 84 including upper and lower arms 86 and 88, faucets 62, opening 90, surfaces 91 and 93, grate 92, pan 94, and a portion of rear segment 80 of left assembly 4 may be directly to the left of left wall 38 and forward of back wall 36.

Left bracket 105 may be in its entirety adjacent left rear corner 39, the left side of back wall 36, and the rear section of left wall 38 rearward of rear wheels 18. A portion of left bracket 105 may be directly behind back wall 36 and a portion of left bracket 105 may be directly to the left of left wall 38. Bar 107 and front spacer 109 of left bracket 105 may be entirely to the left of left wall 38. Left bracket 105 and front spacer 109 may be adjacent front end 117 and extend inwardly from bar 107 to left wall 38 or sidewall 32. Left bracket 105 having rear spacer 111 or axial bar 115 may have an inner or right end 123 and an outer or left end 125 wherein outer or left end 125 may be spaced outwardly to the left of bumper 51 and plate 113 so that left end 125 is not directly above bumper 51 and plate 113. Inner end 123 may be to the right of left wall 38 and left end 125 may be to the left of left wall 38. Bar 107 adjacent rear end 119 may be rigidly or fixedly secured to rear spacer 111 or bar 115 adjacent left end 125 and extend forward therefrom. Spacer 109 may be in contact with left wall 38 or sidewall 32. Fasteners 127, such as those shown in FIG. 2, may extend axially from left bracket 105 and front spacer 109 to left wall 38 to rigidly or fixedly secure left spacer 109 to left wall 38 or sidewall 32, thereby also rigidly or fixedly securing left bracket 105 to left wall 38 or sidewall 32.

In some embodiments, dispenser assembly 4 may be mounted or secured to sidewall 32, also referred to as right wall 40 and left wall 38. For the discussion of FIGS. 6 and 7, the term sidewall 32 will be used. The thickness of open space 79 may be reduced in order to prevent debris, dirt, and other items to collected between the dispenser assembly and the sidewall. Further, additional stability may be provided to dispenser assembly 4 by being mounted onto sidewall 32 as well as reducing the weight and components of mounting bracket 105.

A problem, however, may occur in such embodiments as the materials comprising sidewall 32, such as fiberglass, wood, metal, and the like, tends to warp or change in dimensions as vehicle 1 is in use. Different temperatures may cause the materials of sidewall 32 to expand or contract. Normal use of vehicle 1 also may cause expansion and contraction as well as items within the vehicle being pressed against sidewall 1. Thus, open space 79 may not be entirely eliminated as the expansion and contraction of sidewall 32 is accommodated. This thickness of open space 79 may be limited.

Figure 6:
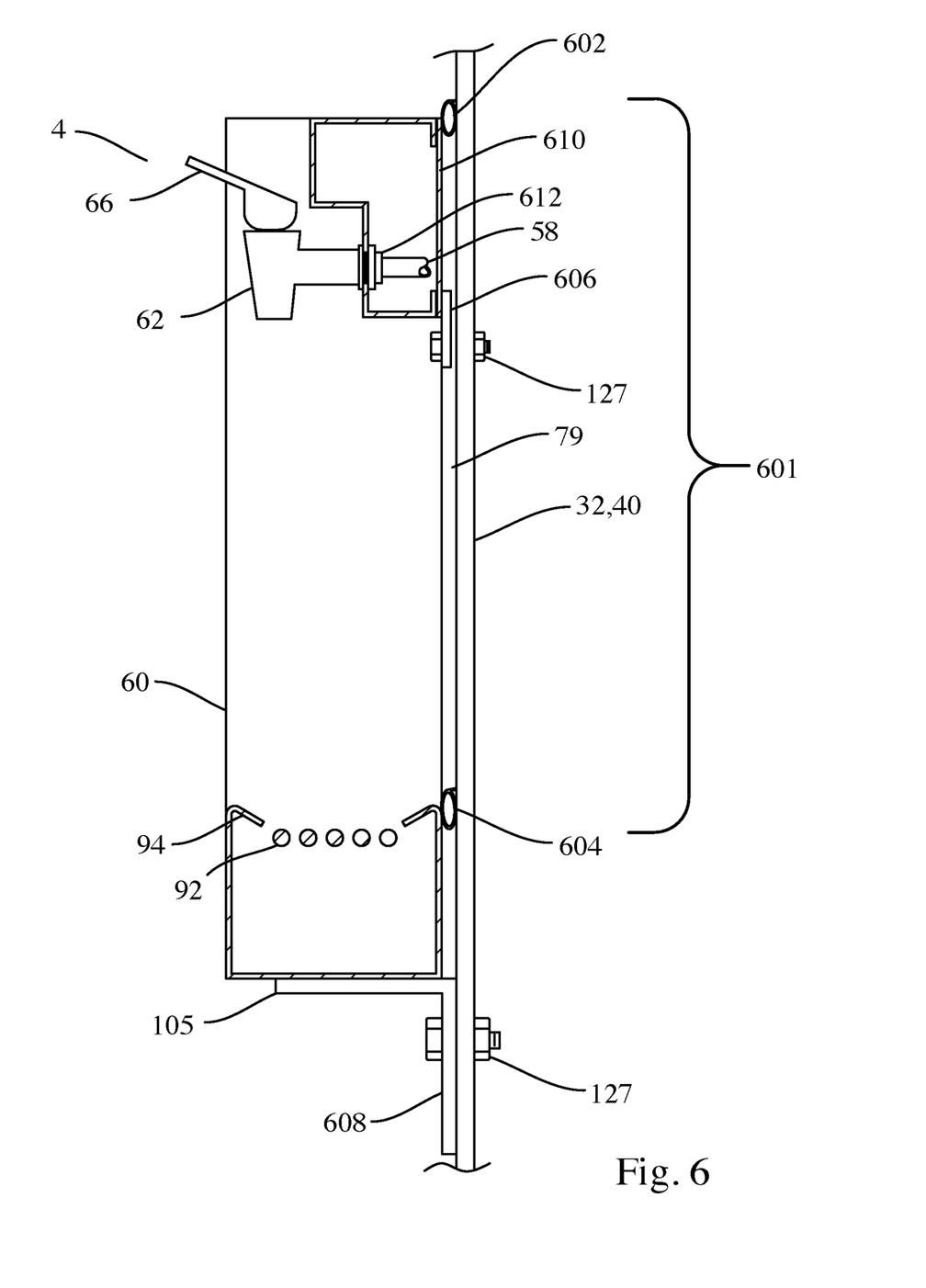
FIG. 6 illustrates a side elevational view of the dispenser assembly mounted onto a sidewall using mounting pieces and a gasket assembly according to the disclosed embodiments.
Figure 7A:
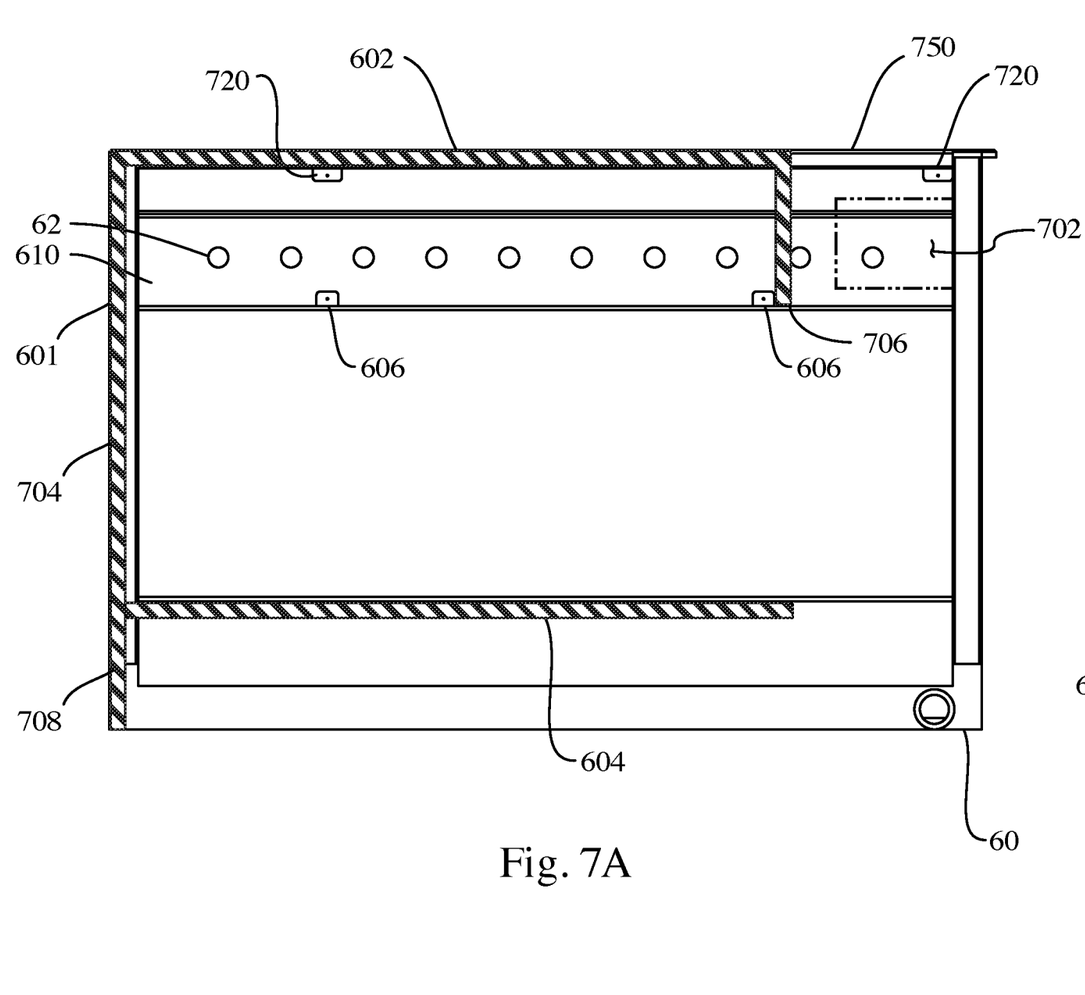
FIG. 7A illustrates a rear elevational view of the dispenser assembly mounted onto a sidewall along with a gasket assembly according to the disclosed embodiments.
Figure 7B:
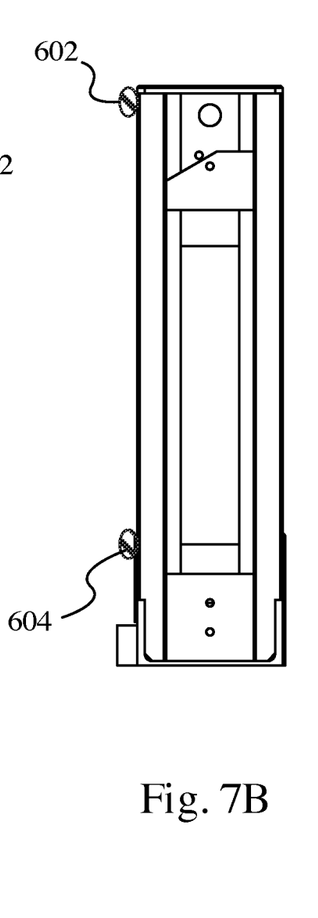
FIG. 7B illustrates a side elevational view of the dispenser assembly according to the disclosed embodiments.

Referring to FIG. 6, dispenser assembly 4 is mounted to sidewall 32 by mounting bracket 105 and upper mounting pieces 606. Preferably, two to five upper mounting pieces 606 may be used to secure dispenser assembly 4. Fasteners 127 engage upper mounting pieces 606 to provide stability for the upper segment of dispenser assembly 4. It also may limit the width of open space 79 to the thickness of the upper mounting pieces. The reduced thickness may prevent debris and dirt from interfering with use of dispenser assembly 4. It also may prevent access to hoses 58 as these are not exposed outside dispenser assembly 4. This feature is disclosed in greater detail in FIG. 7.

Because there will be some fluctuation of sidewall 32 by expansion and contraction during use, open space 79 may not be eliminated. Thus, a small gap may exist between dispenser assembly 4 and sidewall 32. To prevent debris and dirt from being lodged in open space 79, a gasket assembly 601 may be positioned within the open space between dispenser assembly 4 and sidewall 32. Gasket assembly 601 is comprised of seal strips. Preferably, the seal strips are made of rubber or similar material so that the shape of the seal can accommodate expansion or contraction of sidewall 32 and changes in the dimensions of open space 79.

FIG. 6 shows an upper seal strip 602 and a lower seal strip 604. Upper seal strip 602 is positioned at the top of dispenser assembly 4 and positioned accordingly between the dispenser assembly and sidewall 32. This location of upper seal strip may prevent debris, dirt, and other items from being lodged within open space 79 and possibly interfering with any hoses or parts within open space 79. Upper seal strip 602 extends along the length of dispenser assembly 4 from front end 70 to rear end 69. Further, upper mounting pieces 606 may not be exposed to the elements or debris. This feature may prevent rust or deterioration of the mounting assembly using upper mounting pieces 606 and fasteners 127. Because upper seal strip 602 preferably is made of rubber or similar material, the seal may not deteriorate despite exposure to the elements.

Lower seal strip 604 also is positioned within open space 79 but below upper seal strip 602. Lower seal strip 604 preferably is positioned above mounting bracket 105. Fasteners 127 may secure the appropriate component of mounting bracket 105, such as support bar 107, to sidewall 32. Lower sealing strip 604 is above this assembly so as to not interfere with mounting bracket 105 supporting dispenser assembly 4. Preferably, lower seal strip 604 is positioned within open space 79 aligned with pan 92, which catches liquid toppings and other materials. Dispenser assembly 4 may include opening 90 that allows confection 3 and container 5 to be placed under faucets 62. Opening 90 may extend through dispenser assembly 4 such that lower seal strip 604 would be exposed if placed above pan 94. Thus, lower seal strip 604 may be positioned within open space 79 corresponding to pan 94. This position also prevents any debris, dirt, liquid toppings, and other materials within open space 79 through opening 90 or other apertures within dispenser assembly 4 from coming in contact with mounting bracket 105. Deterioration of the mounting assembly will comprise the support of dispenser assembly 104 to mounting bracket 105 and sidewall 32.

Dispenser assembly 4 also includes a chamber 610 located in its upper portion. Chamber 610 may support faucets 62 and provide a space for hoses 58 to connect to the faucets without being exposed outside dispenser assembly 4. Connectors 612 allow hoses 58 to provide liquid topping or other fluids to be dispensed by faucets 62. Because dispenser assembly 4 is mounted to sidewall 32, hoses 58 may not be located within open space 79 between the dispenser assembly and the sidewall. There just may not be enough space to fit the hoses. This feature is disclosed in greater detail below.

FIG. 7A depicts a rear view of dispenser assembly 4 as mounted on sidewall 32 according to the disclosed embodiments. FIG. 7B depicts a side elevational view of the dispenser assembly according to the disclosed embodiments. Sidewall 32 is not shown in FIG. 7A. The rear view is shown as from the position within the interior chamber of vehicle 1, looking outside. The components of dispenser assembly 4 are positioned within open space 79 and against sidewall 32.

Gasket assembly 601 is shown. Upper seal strip 602 and lower seal strip 604 are shown. In some embodiments, upper seal strip 602 and lower seal strip 604 do not extend entirely along with length of dispenser assembly 4. A portion 750 of dispenser assembly does not have a seal strip within open space 79. This portion allows opening 702 to receive hoses 58 into chamber 610 and access to faucets 62. As portion 750 is positioned towards the rear of vehicle 1, any debris or items lodged within open space 79 may be removed easily. Lower seal strip 604 may correspond to the length of upper seal strip 602.

Gasket assembly 601 also includes side seal strips 704, 706, and 708. As shown in FIG. 7A, side seal strip 704 may extend in the vertical direction along the side of dispenser assembly 4 between upper seal strip 602 and lower seal strip 604. Side seal strip 704 is located toward the forward part of vehicle 1 and dispenser assembly 4. Side seal strip 704 further may enclose open space 79 from outside elements and debris. Side seal strip 708 may extend below lower seal strip 604 to provide additional protection from debris and environmental elements coming from the front of vehicle 1. For example, water may splash upwards while vehicle 1 is in use. Side seal strip 708 prevents the water from entering open space 79 to cause potential problems with the mounting of dispenser assembly 4 to sidewall 32.

Side seal strip 706 may extend vertically only part of the distance between upper seal strip 602 and lower seal strip 604 and is located towards the rear of vehicle 1. The potential for debris and elements entering open space 79 from the rear of vehicle 1 may be minimal or reduced compared to the other sides of dispenser assembly 4. The opening provided by side seal strip 706 may allow visual inspection of the mounting of dispenser assembly 4 to sidewall 32. In other embodiments, side seal strip 706 may extend the distance between upper seal strip 602 and lower seal strip 604. The portion of dispenser assembly 4 outside gasket assembly 601, namely rearward of side seal strip 706, may not face sidewall 32 and is exposed.

Mounting pieces 720 may be included to further secure dispenser assembly 4 to sidewall 32. Upper seal strip 602 may be located above mounting pieces 720.

Opening 702 may allow fluid communication between faucets 62 and topping containers 56. Hoses 58 may provide the fluid communication and not exposed significantly to the outside dispenser assembly 4. This feature also prevents hoses 58 from being positioned within open space 79. In some embodiments, hoses 58 will extend outwardly from back wall 36 to opening 702. Some embodiments may include an enclosure positioned on back wall 36 that further covers hoses 58 from the outside. The enclosure also may include an opening that allows hoses to exit to opening 702. The opening in the enclosure may be aligned with opening 702 so that any exposure to the outside is reduced. Hoses 58 also may rest on the bottom or on a shelf within the enclosure so that they are not hanging. Such a configuration reduces the possibility of hoses 58 bunching up or becoming tangled with debris or other components of vehicle 1 or dispenser assembly 4.

The operation of kiosk 1 and the relationship of various components is now described with primary reference to FIGS. 2 and 5 although much of the movement and operational aspects will be understood from the previous description. When the kiosk is in the form of a mobile kiosk or vehicle 1, the driver of the vehicle will drive to a desired selling location for setting up to sell and dispense frozen confections and likely other food items as well. Once the vehicle is parked, dispenser assembly 4 may be immediately ready for use, without further action by the driver or another person for operation/dispensing of liquid toppings from faucets 62 by a customer outside kiosk/vehicle 1. Alternatively, a movable or entirely removable cover may be used that covers all or a portion of assembly 4 during transit, that is, while vehicle 1 is in transit between locations. In a covered or closed position, such a cover may cover or block access to all of assembly 4 or, for instance, to faucets 62 or to faucets 62 as well as grate 92 and pan 94. Where such a cover is used, the driver or another person may uncover dispenser assembly 4 before the assembly is ready for use by the customers. One may move or remove the cover from assembly 4 or portions thereof to change the covered or closed position to an uncovered or open position.

Referring to FIG. 5, once the vendor has parked vehicle 1, the system is ready for producing, dispensing, and selling frozen confections. More particularly, the vendor or operator may operate device 2 shown in FIG. 1 to produce frozen confection 3 within a cup, cone, dish, or the like after having been ordered by a customer via serving window 44 when panel 46 is open. The vendor the receives money or another form of payment through the service window and hands or moves confection 3 within container 5 through the service window, as shown by arrow C, to the customer outside vehicle 1. Arrows E and F show the general pedestrian or customer traffic flow during the process of selling the frozen confections and applying the liquid topping onto the confection. More particularly, arrow E illustrates a line of customers and a customer approaching the service window to place the order and arrow F illustrates the customer walking rearwardly toward dispenser assembly 4, where the customer uses one or more faucets 62 to apply one or more liquid toppings to the confection. FIG. 5 also illustrates a customer using one of faucets 62 by manually moving control 66 of the given faucet 62 with a finger to open faucet 62 such that the liquid topping flows from one of containers 56 through hose 58 and the corresponding spout 64 and downwardly onto confection 3.

The use of the left and right dispenser assemblies not only increases the overall capacity for dispensing the liquid toppings due to the increased number of faucets 62, but also may increase the rate at which frozen confections 3 may be dispensed from within the kiosk especially in combination with an additional serving window 44 and corresponding panel 46. Thus, one or more workers inside the vehicle may simultaneously form and dispense frozen confections 3 for dispensing through the two service windows 44, thus creating two lines of customers represented by arrows E, to increase the rate at which frozen confections 3 may be sold and dispensed through service windows 44 and also the rate at which customers may apply the toppings via the various faucets 62 of the left and right dispenser assemblies 4. As noted above, the kiosk may be stationary or mobile and may utilize one or more dispenser assemblies external to the kiosk to essentially increase the rate at which frozen confections may be sold and distributed. One or more of the dispensers may be mounted on or adjacent the kiosk, to include the options of a dispenser mounted on a trailer.

It will be apparent to those skilled in the art that various modifications to the disclosed embodiments may be made without departing from the spirit or scope of the invention. Thus, it is intended that the present invention covers the modifications and variations disclosed above provided that these changes come within the scope of the claims and their equivalents.

The invention claimed is:

1. An apparatus comprising:
    a kiosk comprising a first sidewall, a second sidewall, and a back wall defining an interior chamber;

an axial axis of the kiosk defined as horizontally extending from the back wall between the first sidewall and the second sidewall;

a mounting bracket extending external to the first sidewall or the second sidewall;

a liquid topping dispenser assembly including a support and a plurality of liquid dispensing faucets carried by the support, wherein the dispenser assembly is seated on the mounting bracket, the dispenser assembly secured to the mounting bracket so that the dispenser assembly is fixed with respect to the first sidewall or the second sidewall to form an open space between the dispenser assembly and the first or second sidewall;

a gasket assembly positioned within the open space between the dispenser assembly and the first or second sidewall;

a plurality of fasteners to further mount the dispenser assembly to the first or second sidewall; and at least one upper mounting piece to secure the dispenser assembly to the first or second sidewall using at least one of the plurality of fasteners, wherein an upper seal strip of the gasket assembly is located above the at least one upper mounting piece.

2. The apparatus of claim 1, wherein the plurality of fasteners includes one or more fasteners to mount the mounting bracket to the first or second sidewall.

3. The apparatus of claim 1, wherein a width of the open space corresponds to the at least one upper mounting piece.

4. The apparatus of claim 1, wherein the gasket assembly comprises at least one seal strip.

5. The apparatus of claim 4, wherein a seal strip of the at least one seal strip is positioned above the mounting bracket within the open space.

6. The apparatus of claim 4, wherein a seal strip of the at least one seal strip is positioned vertical to the axial axis of kiosk.

7. The apparatus of claim 1, wherein the upper seal strip is positioned at a top of the dispenser assembly.

8. The apparatus of claim 1, wherein the dispenser assembly includes a downwardly facing bottom surface that is seated on an upwardly facing surface of the mounting bracket.

9. The apparatus of claim 1, wherein the gasket assembly is positioned within the open space such that a gap is not formed entirely laterally between the dispenser assembly and the first or second sidewall.

10. The apparatus of claim 1, further comprising a plurality of liquid topping containers within the interior chamber and a plurality of hoses that are in communication with the plurality of faucets and the plurality of containers.

11. The apparatus of claim 10, wherein the dispenser assembly includes a hole for the plurality of hoses to access the plurality of faucets.

12. The apparatus of claim 1, wherein the kiosk is a vehicle or a trailer.

13. The apparatus of claim 1, wherein a portion of the dispenser assembly extends further than the upper seal strip.

14. An apparatus comprising:

a kiosk having at least one sidewall to define an interior chamber;

a frozen confection forming device positioned within the interior chamber and a serving window formed through the sidewall and configured to allow a frozen confection to pass through the serving window from the interior chamber to outside the kiosk;

a liquid topping dispenser assembly includes a support and a plurality of liquid dispensing faucets carried by the support, wherein the dispenser assembly is secured to the sidewall using a mounting bracket so that the dispenser assembly is fixed with respect to the sidewall to form an open space between the dispenser assembly and the sidewall;

a plurality of hoses connected to the plurality of dispensing faucets and to a plurality of containers of liquid toppings in the interior chamber;

a gasket assembly including a plurality of seal strips positioned in the open space between the dispenser assembly and the sidewall, the plurality of seal strips having an upper seal strip in contact with a top of the dispenser assembly and the sidewall and a lower seal strip positioned above the mounting bracket;

a plurality of fasteners to secure the dispenser assembly to the sidewall using at least one mounting piece; and at least one upper mounting piece to secure the dispenser assembly to the first or second sidewall using at least one of the plurality of fasteners, wherein the upper seal strip of the gasket assembly is located above the at least one upper mounting piece.

15. The apparatus of claim 14, wherein the dispenser assembly further includes a chamber to receive the plurality of hoses connected to the plurality of faucets.

16. The apparatus of claim 15, wherein the dispenser assembly includes an opening positioned outside of the gasket assembly to allow the plurality of hoses into the chamber.

17. The apparatus of claim 14, wherein a portion of the dispenser assembly extends further than the upper seal strip.

* * * * *